US012661835B2

(12) United States Patent
Thomas

(10) Patent No.: US 12,661,835 B2
(45) Date of Patent: Jun. 23, 2026

(54) FLEXIBLE STRUCTURAL REINFORCEMENT

(71) Applicant: Zephyros, Inc., Romeo, MI (US)

(72) Inventor: Joseph R. Thomas, Romeo, MI (US)

(73) Assignee: ZEPHYROS, INC., Romeo, MI (US)

( * ) Notice: Subject to any disclaimer, the term of this patent is extended or adjusted under 35 U.S.C. 154(b) by 116 days.

(21) Appl. No.: 18/280,129

(22) PCT Filed: Apr. 18, 2022

(86) PCT No.: PCT/US2022/025230

§ 371 (c)(1),
(2) Date: Sep. 1, 2023

(87) PCT Pub. No.: WO2022/221769

PCT Pub. Date: Oct. 20, 2022

(65) Prior Publication Data

US 2024/0075663 A1 Mar. 7, 2024

Related U.S. Application Data

(60) Provisional application No. 63/175,863, filed on Apr. 16, 2021.

(51) Int. Cl.
B29C 45/00 (2006.01)
B29C 45/14 (2006.01)
(Continued)

(52) U.S. Cl.
CPC ...... B29C 45/0017 (2013.01); B29C 45/0062 (2013.01); B29C 45/0081 (2013.01);
(Continued)

(58) Field of Classification Search
None
See application file for complete search history.

(56) References Cited

U.S. PATENT DOCUMENTS 6,494,525 B1 * 12/2002 Blank .................. B62D 29/002
296/187.02
7,144,071 B2 12/2006 Le Gall et al.
(Continued)

FOREIGN PATENT DOCUMENTS

DE 102015016011 A1 6/2017
EP 1328415 A1 7/2003
(Continued)

OTHER PUBLICATIONS

PCT International Search Report & Written Opinion dated Aug. 25, 2022, Application No. PCT/US2022/025230.

*Primary Examiner* — Laura C Powers
(74) *Attorney, Agent, or Firm* — The Dobrusin Law Firm, P.C.

(57) ABSTRACT

The present teachings generally relate to a flexible, structural carrier for reinforcement of hollow tubes, cavities, and the like. The structural carrier comprises two or more reinforcing member segments; a foamable material disposed along a portion of the two or more reinforcing member segments; and at least one insert that connects the two or more reinforcing member segments in a manner that enables flexible movement of the segments relative to each other. The carrier is adapted for the structural reinforcement of a hollow tube or cavity featuring complex curvatures.

20 Claims, 4 Drawing Sheets

(51) Int. Cl.

| | | |
|---|---|---|
| *B29C 45/16* | (2006.01) | |
| *B29K 67/00* | (2006.01) | |
| *B29K 75/00* | (2006.01) | |
| *B29K 77/00* | (2006.01) | |
| B29K 105/04 | (2006.01) | |

(52) U.S. Cl.
   CPC ........ *B29C 45/14631* (2013.01); *B29C 45/16* (2013.01); *B29C 2045/0067* (2013.01); *B29C 2045/1601* (2013.01); *B29K 2067/003* (2013.01); *B29K 2075/00* (2013.01); *B29K 2077/00* (2013.01); *B29K 2105/04* (2013.01)

(56)                    References Cited

U.S. PATENT DOCUMENTS

| | | | |
|---|---|---|---|
| 9,381,716 B2 | 7/2016 | Quaderer | |
| 2002/0033617 A1 | 3/2002 | Blank | |
| 2003/0057737 A1 | 3/2003 | Bock | |
| 2004/0207233 A1* | 10/2004 | Bock | B62D 29/002 |
| | | | 296/187.02 |
| 2011/0206890 A1* | 8/2011 | Belpaire | B62D 29/002 |
| | | | 428/68 |
| 2013/0037734 A1 | 2/2013 | Kerschbaumer et al. | |
| 2014/0087126 A1 | 3/2014 | Quaderer | |

FOREIGN PATENT DOCUMENTS

| | | | |
|---|---|---|---|
| EP | 1364862 A2 | 11/2003 | |
| EP | 2556939 A1 | 2/2013 | |
| JP | 2004025693 A * | 1/2004 | |

* cited by examiner

FLEXIBLE STRUCTURAL REINFORCEMENT

FIELD

The present teachings generally relate to a flexible, structural carrier for reinforcement of hollow tubes, cavities, and the like.

BACKGROUND

Oftentimes parts with hollow cavities are fitted with structural members to provide adequate reinforcement, thereby improving the structural integrity of the part. Traditional, rigid reinforcement members may not be suitable when the geometry of the cavity features complex curvatures, as a rigid reinforcement member is unable to fit and/or adapt within the confines of the curves.

U.S. Pat. No. 7,144,071 describes structural reinforcements integrally formed with flexible sections to allow flexibility at certain points along the reinforcements. The material of the flexible sections matches that of the structural reinforcements themselves, such that the nature and small gauge of the material (generally polyamide) facilitates the ability of flexible sections to flex.

There remains a need in the art of structural reinforcement for alternative techniques that allow for the reinforcement of hollow tubes and cavities featuring complex curvatures. Such reinforcement would allow for the downgrading and downgauging of the tube material, providing cost savings to the manufacturer. Thus, there remains a need for a flexible, structural reinforcement carrier that can be employed with success in hollow tubes and cavities featuring curves, bends, and the like.

SUMMARY

The present disclosure relates to a structural carrier comprising two or more reinforcing member segments, a foamable material disposed along a portion of the two or more reinforcing member segments, and at least one insert that connects the two or more reinforcing member segments, the at least one insert comprising a first material that is overmolded or insert molded with a second material and the first material does not adhere to the second material so that the insert can move freely relative to the second material.

The structural carrier may be adapted for the structural reinforcement of a hollow tube or cavity. The two or more reinforcing member segments may include one or more ribs for substantially preventing the structural carrier from excessive rotation. The foamable material may be an adhesive, sealant, or combination thereof. The insert may be formed as a swivel, a ball and socket, concentric circles, football shaped, H-shaped, or any combination thereof.

The first material may be a polymeric material that is different from the second material. The first material may be selected from polybutylene terephthalate, and polyethylene terephthalate. The second material may be a polyamide material or a polyurethane material. The first material may include one or more additives selected from minerals, reinforcing fiber, hydrophobic silica, calcium carbonate, tabular alumina, or any combination thereof. The first material may include at least one mineral component.

The insert may be free of any contact with the foamable material prior to foaming of the foamable material. The insert may be free of any contact with the foamable material after foaming of the foamable material. The first material and second material may be molded together in a multi-shot injection molding process. The first material may be formed first and later insert molded within the second material. The second material may also form the two or more reinforcing segments. The carrier may be located into a hydroformed tube.

The first material may be rigid. The first material may be flexible. The two or more reinforcing segments may be solid and free of any cavities formed within. The two or more reinforcing segments may include a cavity that is inaccessible and thus free of any foamable material prior to or after foaming. The two or more reinforcing segments may include a cavity that is free of any foamable material prior to foaming. The two or more reinforcing segments may include a cavity that is free of any foamable material after foaming. The two or more reinforcing segments may be adapted to only move relative to one another along one axis. The two or more reinforcing segments may be adapted to move relative to one another along exactly two axes.

At least a portion of the two or more reinforcing segments may lie in direct planar contact with the insert. The two or more reinforcing segments (not inclusive of the insert) may be separated from one another by at least 1 cm, at least 2 cm, at least 3 cm, or even at least 4 cm. The two or more reinforcing segments (not inclusive of the insert) may be separated from one another by less than 10 cm, less than 8 cm, less than 6 cm, or even less than 2 cm. The two or more reinforcing segments may be separated from one another by less than 1 cm. The two or more reinforcing segments may be identical in size and shape. The two or more reinforcing segments may differ in length at their largest cross section. The two or more reinforcing segments may be of differing shapes.

DETAILED DESCRIPTION

Figure 1:
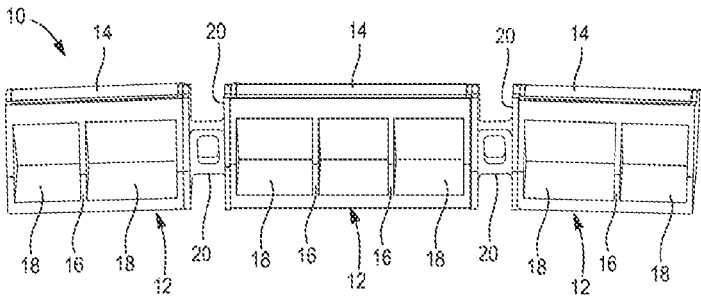
FIG. 1 shows an illustrative example of a structural carrier in accordance with the present teachings.

The explanations and illustrations presented herein are intended to acquaint others skilled in the art with the teachings, its principles, and its practical application. Those skilled in the art may adapt and apply the teachings in its numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

This application is related to and claims the benefit of the filing date of U.S. Provisional Application No. 63/175,863 which is incorporated by reference herein for all purposes.

This application incorporates, by reference herein for all purposes, U.S. Pat. Nos. 7,144,071 and 9,381,716.

The present teachings provide for a structural carrier. The structural carrier may function to provide reinforcement of parts such as hollow tubes, cavities, and the like. The structural carrier may be flexible so as to allow for the reinforcement of parts featuring complex curvatures, bends, and the like. The structural carrier may comprise two or more reinforcing member segments.

The reinforcing member segments may function to provide adequate reinforcement to the part or structure inserted therein. The reinforcing member segments may be made from any suitable material known in the art. For example, the reinforcing member segments may be made of one or more of the following: metals, plastics, thermoplastics, polymers, elastomers, fibrous materials (e.g., cloth or woven materials), nylon, polyester, and combinations thereof. The reinforcing member segments may be flexible or rigid depending on the application requirements. The reinforcing member segments may be prepared by any suitable fabrication method known in the art. For example, the reinforcing member segments may be prepared by extrusion, pultrusion, injection molding, stamping, die casting and the like. The reinforcing member segments may comprise one or more ribs.

The one or more ribs may function to provide additional reinforcement. The one or more ribs may function to prevent the reinforcing member segments from rotating excessively during use and/or packaging. The one or more ribs may extend in a substantially transverse direction in relation to the longitudinal axis of the structural carrier. The one or more ribs may create a plurality of cavities arranged along the reinforcing member segments.

The reinforcing member segments may contain a foamable material. The foamable material may function as a sealant, an adhesive, and/or a combination thereof. The foamable material may function to foam thereby filling the space between the carrier structure and the interior of the part being reinforced. The foamable material may function to adhesively bond the reinforcing member segments to the interior of the part being reinforced. The foamable material may be disposed along a portion of the reinforcing member segment by any method suitable in the art. One or more reinforcing member segments may be free of any foamable material.

The foamable materials may include one or more epoxy-based components. Such components may include a base resin comprising one or more epoxide functional materials. The epoxy material may act as component to a crosslinking network upon cure of the material. One exemplary epoxy resin may be a phenolic resin, which may be a novolac type or other type resin. Other preferred epoxy containing materials may include a bisphenol-A epichlorohydrin ether polymer, or a bisphenol-A epoxy resin which may be modified with butadiene or another polymeric additive or bisphenol-F-type epoxy resins.

The foamable materials may include one or more acrylate-based components. Suitable acrylate-based components may include but are not limited to methacrylic acid, acrylic acid, methyl acrylate, methyl methacrylate, ethyl acrylate, ethyl methacrylate, propyl acrylate, propyl methacrylate, butyl acrylate and butyl methacrylate. It has been found that the C1-6-alkyl (meth)acrylate, preferably methyl (meth) acrylate or ethyl(meth)acrylate, more preferably methyl methacrylate, may improve the adhesion of the structural adhesive of plastic substrates. This is therefore particularly advantageous when the adhesive is used for bonding metal-to-composite parts or composite-to-composite parts.

The foamable materials may include one or more ethylene-based components. These components may include an acrylate copolymer, an acetate copolymer or both. The material may include ethylene methyl acrylate (EMA), ethylene vinyl acetate (EVA) or a combination thereof.

The foamable materials one or more additional polymeric components. For example, without limitation, other polymers that might be appropriately incorporated into the material include halogenated polymers, polycarbonates, polyketones, urethanes, polyesters, silanes, sulfones, allyls, olefins, styrenes, acetates, ethylene vinyl acetates, acrylates, methacrylates, epoxies, silicones, phenolics, rubbers, polyphenylene oxides, terphthalates, or mixtures thereof. Other potential polymeric materials may be or may include, without limitation, polyethylene, polypropylene, polystyrene, polyolefin, polyacrylate, poly(ethylene oxide), poly(ethyleneimine), polyester, polyurethane, polysiloxane, polyether, polyphosphazine, polyamide, polyimide, polyisobutylene, polyacrylonitrile, poly(vinyl chloride), poly(methylmethacrylate), poly(vinyl acetate), poly(vinylidene chloride), polytetrafluoroethylene, polyisoprene, polyacrylamide, polyacrylic acid, polymethacrylate, polyacetals or mixtures thereof.

The two or more reinforcing member segments may be connected together via an insert. The insert may function to provide the desired degree of flexibility and/or rotation to the structural carrier along the insert portion. The insert may function to enable the structural carrier to be maneuvered to match the contours of the part in which it is being inserted. The insert may be flexible or rigid, depending on the application requirements. The insert may be flexed during installation so that the size and shape of the structural carrier conforms to the part in which it is being inserted.

The insert may be made from any suitable material known in the art. For example, the insert may be made of one or more of the following: metals, plastics, thermoplastics, polymers, elastomers, fibrous materials (e.g., cloth or woven materials), nylon, polyester, and combinations thereof. The insert material may be prepared by any suitable fabrication method known in the art. For example, the insert may be injection molded (e.g., 2 or 3 shot injection molded), insert molded, overmolded, extruded, pultruded, stamped, die casted or the like. The insert may be created during manufacture of the structural carrier. The insert may be preformed and assembled offline. If overmolding is utilized, the material of the insert may be different than the material of the overmold so as to prevent adhesion of the materials thereby allowing freedom of the components to move with relation to one another. As one non-limiting example, the insert may include a mineral-filled polybutylene terephthalate (PBT) overmolded with PA6 GF nylon.

The insert may be any suitable geometric shape depending on the application requirements and the degree of flexibility and/or rotation required. For example, the insert may be a swivel, a ball and socket, concentric circles, football shaped, H-shaped, or any combination thereof. Non-limiting exemplary inserts are shown in the figures and described herein below.

The first material may include one or more minerals. The one or more minerals (i.e., "mineral reinforcement") may function to structurally reinforce the reaction product. The one or more minerals may improve tensile strength, the flexural strength, or both of the reaction product. The one or more minerals may be any suitable silicate minerals including but not limited to inosilicates (e.g., Wollastonite) and phyllosilicates (e.g., Kaolinite, Vermiculite, Talc, Muscovite, etc.). The characteristic external shape of an individual crystal or crystal group of the one or more minerals may be acicular or needle-like. The median particle size of the one or more minerals may be from about 10 microns to about 20 microns. The median particle size may be from about 12 microns to about 18 microns.

The one or more minerals may include Wollastonite (CaSiO3). The Wollastonite may be relatively pure (i.e., less than 2% by weight of impurities such as other metal oxides). The Wollastonite may contain impurities including one or more oxides of iron, magnesium, manganese, aluminum, potassium, sodium, or strontium substituting for calcium in the mineral structure. Examples of suitable Wollastonite may be that sold under the trade names NYGLOS® 12 and NYGLOS® 8 commercially available from NYCO Minerals Inc. (Willsboro, N.Y.).

The first material may include one or more reinforcing fibers. The reinforcing fiber may function to structurally reinforce the reaction product. The one or more reinforcing fibers may improve tensile strength, flexural strength, or both of the reaction product. The one or more reinforcing fibers may be dispersed homogenously within the first material. The one or more reinforcing fibers may comprise polymeric fibers, glass fibers (i.e., fiberglass), or both. Polymeric fibers may include nylon, polyamide, polyester, polypropylene, polyethylene, polytetrafluoroethylene, aramid fibers (e.g., Kevlar®), the like, or any combination thereof. The glass fibers may include alumino-borosilicate glass ("E-glass"), alkali-lime glass ("A-glass" or "C-glass"), electrical/chemical resistance glass ("E-CR-glass"), borosilicate glass ("D-glass"), alumino-silicate glass ("R-glass" or "S-glass"), or any combination thereof. The reinforcing fiber may be chopped fiber. The reinforcing fiber may be a chopped length of about 0.1 cm or more, about 0.3 cm or more, or even about 0.6 cm or more. The reinforcing fiber may be a chopped length of about 2.0 cm or less, about 1.5 cm or less, or even about 1.0 cm or less. Examples of suitable fiberglass may be chopped strands commercially available from Jushi USA (Columbia, S.C.).

The second material may comprise one or more of polyamide (PA, such as Nylon 6 and Nylon 66), polyurethane, polypropylene (PP), polyphenylene sulfide (PPS), polybutylene terephthalate (PBT), polyetheretherketone (PEEK), polyethylene terephthalate (PET), polycarbonate, polyethylene, polystyrene, polyvinyl chloride, or any combination thereof.

The present teachings may be further explained by the following illustrative figures.

FIG. 1 shows an illustrative example of a structural carrier 10 of the present teachings. The structural carrier 10 includes two or more reinforcing member segments 12 (three segments depicted). Each reinforcing member segment includes a strip of foamable material 14 disposed along a portion of the reinforcing member segment. Each of the reinforcing member segments 12 include one or more ribs 16 which create a plurality of cavities 18 arranged along the reinforcing member segments. An insert 20 connects the reinforcing member segments 12 to each other, providing flexible movement of the reinforcing member segments relative to each other.

Figure 2:
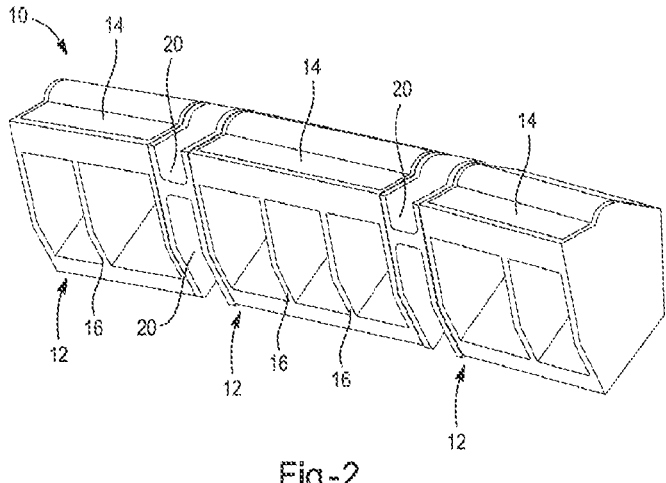
FIG. 2 shows a perspective view of the structural carrier of FIG. 1.

FIG. 2 shows a perspective view of the structural carrier 10 of FIG. 1. The structural carrier 10 comprises three reinforcing member segments 12 connected via two inserts 20. Each of the reinforcing member segments 12 include a strip of foamable material 14 disposed along a longitudinal portion of the reinforcing member segment. Each of the reinforcing member segments 12 include one or more ribs 16, arranged transverse to the longitudinal axis of the structural carrier, which create a plurality of cavities arranged along the reinforcing member segments.

Figure 3:
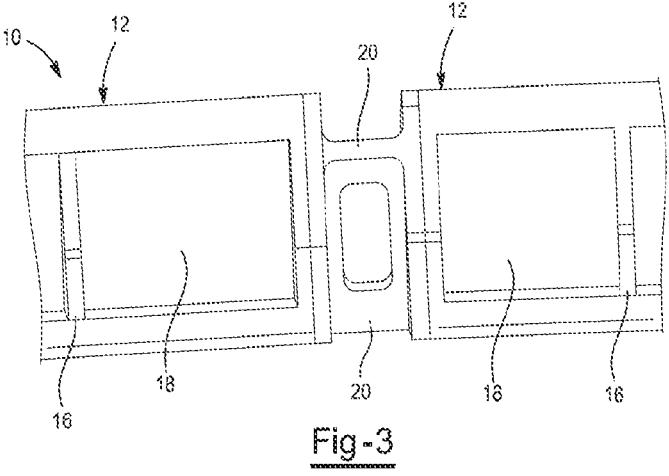
FIG. 3 shows a portion of the structural carrier of FIG. 1.

FIG. 3 shows a portion of the structural carrier 10 of FIG. 1. The insert 20 connects two reinforcing member segments 12 together. A portion of each of the two reinforcing member segments are depicted, including the ribs 16 and cavities 18 of the reinforcing member segments.

Figure 4:
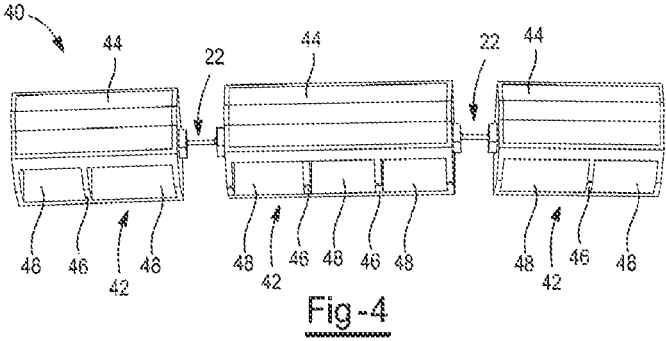
FIG. 4 shows another illustrative example of a structural carrier in accordance with the present teachings.

FIG. 4 shows another illustrative example of a structural carrier 40 of the present teachings. FIG. 4 is similar to the structural carrier of FIG. 1. The structural carrier 40 includes two or more reinforcing member segments 42 (three segments depicted). Each reinforcing member segment includes a strip of foamable material 44 disposed along a portion of the reinforcing member segment. Each of the reinforcing member segments 42 include one or more ribs 46 which create a plurality of cavities 48 arranged along the reinforcing member segments. A swivel insert 22 connects the reinforcing member segments 42 to each other, providing flexible, rotational movement of the reinforcing member segments relative to each other.

Figure 5:
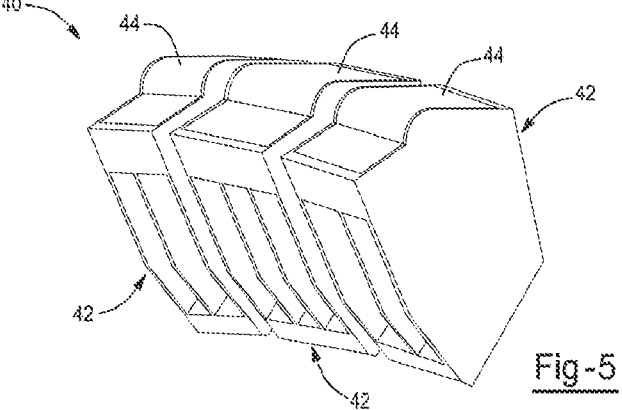
FIG. 5 shows a perspective view of the structural carrier of FIG. 4.

FIG. 5 shows a perspective view of the structural carrier 40 of FIG. 4. The structural carrier 40 comprises three reinforcing member segments 42 connected via two swivel inserts 22 (not shown). Each of the reinforcing member segments 42 include a strip of foamable material 44 disposed along a longitudinal portion of the reinforcing member segment. Each of the reinforcing member segments 42 include one or more ribs 46, arranged transverse to the longitudinal axis of the structural carrier, which create a plurality of cavities arranged along the reinforcing member segments.

Figure 6:
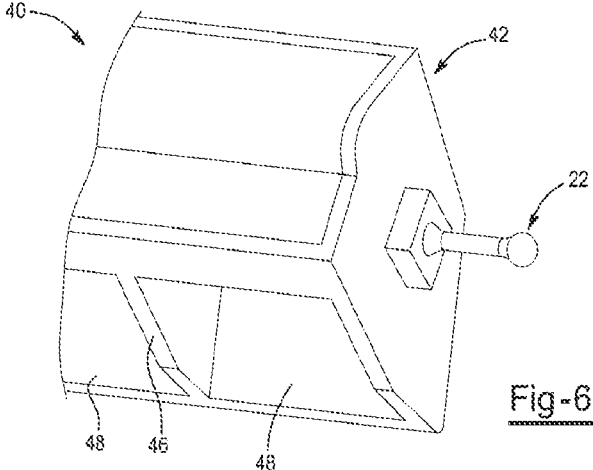
FIG. 6 shows a portion of the structural carrier of FIG. 4.

FIG. 6 shows a portion of the structural carrier 40 of FIG. 4. The swivel insert 22 is attached to the end of one reinforcing member segment 42.

Figure 7:
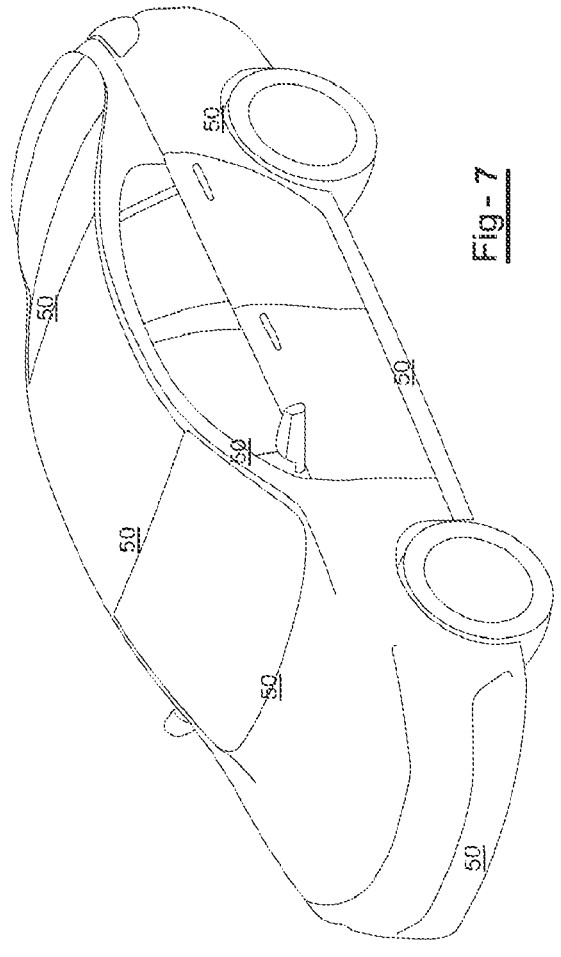
FIG. 7 shows a perspective view of a vehicle where the exemplary carriers described herein may be located.

FIG. 7 shows a vehicle with locations 50 along the vehicle where carriers as described herein may be located. As can be appreciated, anywhere along a vehicle body where tubes and in particular hydroformed tubes can be located, the carriers described herein may be located in said tubes and able to curve as necessary.

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The terms "generally" or "substantially" to describe angular measurements may mean about +/−10° or less, about +/−5° or less, or even about +/−1° or less. The terms "generally" or "substantially" to describe angular measurements may mean about +/−0.01° or greater, about +/−0.1° or greater, or even about +/−0.5° or greater. The terms "generally" or "substantially" to describe linear measurements, percentages, or ratios may mean about +/−10% or less, about +/−5% or less, or even about +/−1% or less. The terms "generally" or "substantially" to describe linear measurements, percentages, or ratios may mean about +/−0.01% or greater, about +/−0.1% or greater, or even about +/−0.5% or greater.

Unless otherwise stated, any numerical values recited herein include all values from the lower value to the upper value in increments of one unit provided that there is a separation of at least 2 units between any lower value and any higher value. As an example, if it is stated that the amount of a component, a property, or a value of a process variable such as, for example, temperature, pressure, time and the like is, for example, from 1 to 90, from 20 to 80, or from 30 to 70, it is intended that intermediate range values such as (for example, 15 to 85, 22 to 68, 43 to 51, 30 to 32 etc.) are within the teachings of this specification. Likewise, individual intermediate values are also within the present teachings. For values which are less than one, one unit is considered to be 0.0001, 0.001, 0.01, or 0.1 as appropriate. These are only examples of what is specifically intended and all possible combinations of numerical values between the lowest value and the highest value enumerated are to be considered to be expressly stated in this application in a similar manner. Unless otherwise stated, all ranges include both endpoints and all numbers between the endpoints.

As can be seen, the teaching of amounts expressed as "parts by weight" herein also contemplates the same ranges expressed in terms of percent by weight. Thus, an expression in the of a range in terms of "at least 'x' parts by weight of the resulting composition" also contemplates a teaching of ranges of same recited amount of "x" in percent by weight of the resulting composition."

The term "consisting essentially of" to describe a combination shall include the elements, ingredients, components, or steps identified, and such other elements ingredients, components or steps that do not materially affect the basic and novel characteristics of the combination. The use of the terms "comprising" or "including" to describe combinations of elements, ingredients, components, or steps herein also contemplates embodiments that consist essentially of the elements, ingredients, components, or steps.

Plural elements, ingredients, components, or steps can be provided by a single integrated element, ingredient, component, or step. Alternatively, a single integrated element, ingredient, component, or step might be divided into separate plural elements, ingredients, components, or steps. The disclosure of "a" or "one" to describe an element, ingredient, component, or step is not intended to foreclose additional elements, ingredients, components, or steps.

It is understood that the above description is intended to be illustrative and not restrictive. Many embodiments as channel as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

What is claimed is:

1. A structural carrier comprising:
   i. two or more reinforcing member segments;
   ii. a foamable material disposed along a portion of the two or more reinforcing member segments; and
   iii. at least one insert that connects the two or more reinforcing member segments, the at least one insert comprising a first material that is overmolded or insert molded with a second material, the second material being different from the first material, and the first material does not adhere to the second material so that the first material can move freely relative to the second material;

wherein the structural carrier is adapted for the structural reinforcement of a hollow tube or cavity.

2. The structural carrier of claim 1, wherein the two or more reinforcing member segments include one or more ribs for substantially preventing the structural carrier from excessive rotation.

3. The structural carrier of claim 1, wherein the foamable material is an adhesive, sealant, or combination thereof.

4. The structural carrier of claim 3, wherein the at least one insert may be a swivel, a ball and socket, concentric circles, football shaped, H-shaped, or any combination thereof.

5. The structural carrier of claim 4, wherein the first material is a polymeric material that is different from the second material.

6. The structural carrier of claim 3, wherein the first material is selected from polybutylene terephthalate, and polyethylene terephthalate.

7. The structural carrier of claim 3, wherein the second material is a polyamide material or a polyurethane material.

8. The structural carrier of claim 6, wherein the first material includes one or more additives selected from minerals, reinforcing fiber, hydrophobic silica, calcium carbonate, tabular alumina, or any combination thereof.

9. The structural carrier of claim 1, wherein the at least one insert is free of any contact with the foamable material prior to foaming of the foamable material.

10. The structural carrier of claim 1, wherein the at least one insert is free of any contact with the foamable material after foaming of the foamable material.

11. The structural carrier of claim 4, wherein the first material and the second material are molded together in a multi-shot injection molding process.

12. The structural carrier of claim 1, wherein the first material is formed first and later insert molded within the second material.

13. The structural carrier of claim 1, wherein the second material also forms the two or more reinforcing member segments.

14. A hydroformed tube comprising the structural carrier of claim 1.

15. The structural carrier of claim 1, wherein the two or more reinforcing member segments are solid and free of any cavities formed within.

16. The structural carrier of claim 1, wherein the two or more reinforcing member segments include a cavity that is free of any foamable material prior to or after foaming.

17. The structural carrier of claim 4, wherein at least a portion of the two or more reinforcing member segments lie in direct planar contact with the at least one insert.

18. The structural carrier of claim 10, wherein the two or more reinforcing member segments, not inclusive of the at least one insert, are separated from one another by at least 1 cm.

19. The structural carrier of claim 18, wherein the two or more reinforcing member segments, not inclusive of the at least one insert, are separated from one another by less than 10 cm.

20. The structural carrier of claim 1, wherein the two or more reinforcing member segments are identical in size and shape.

\* \* \* \* \*